Dec. 17, 1963     D. M. FINCH     3,114,506
LIGHT FIXTURE FOR LINEAL GUIDANCE SYSTEM
Original Filed Feb. 19, 1959     3 Sheets-Sheet 1
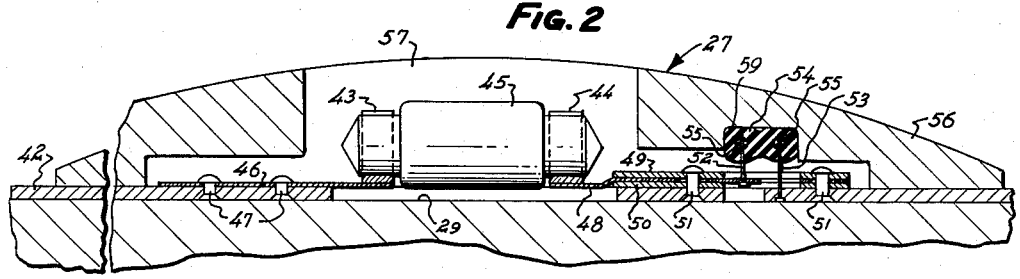
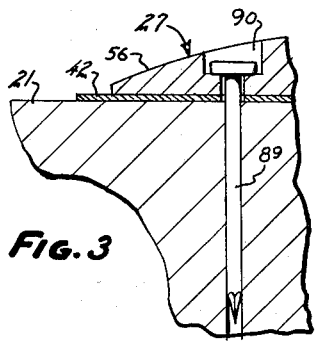
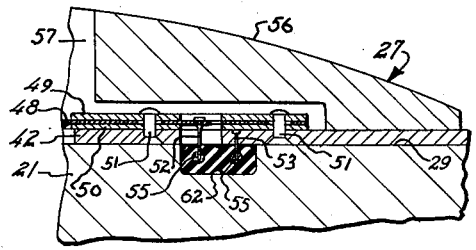
INVENTOR.
DAN M. FINCH
BY
ATTORNEY Dec. 17, 1963 D. M. FINCH 3,114,506
LIGHT FIXTURE FOR LINEAL GUIDANCE SYSTEM
Original Filed Feb. 19, 1959 3 Sheets-Sheet 2
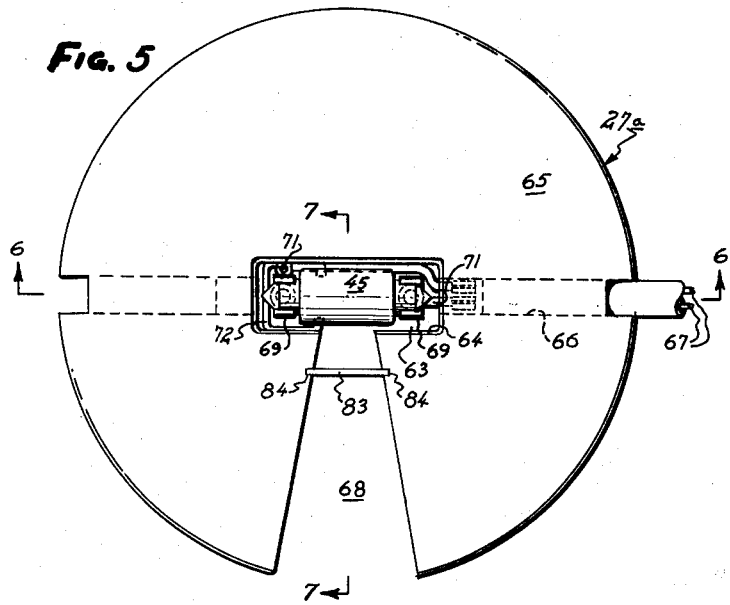
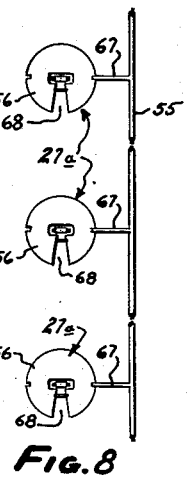
FIG. 8
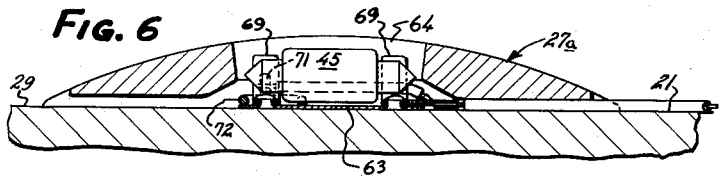
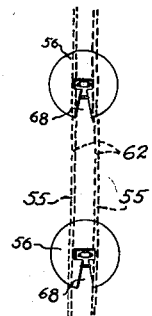
FIG. 9
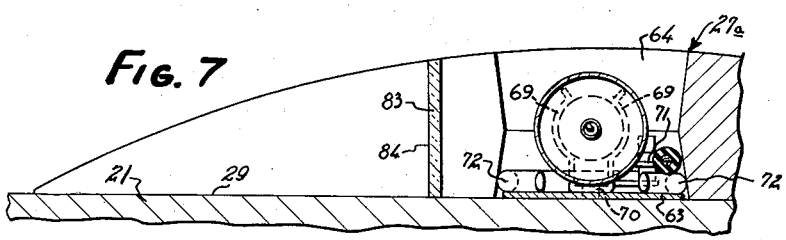
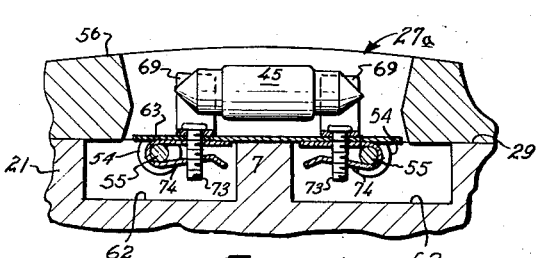
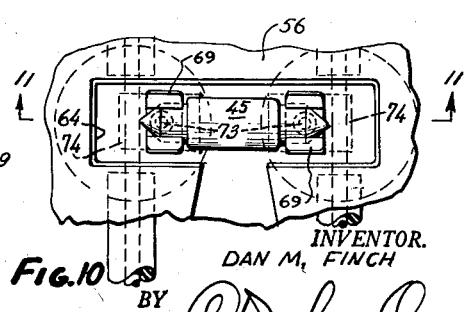
INVENTOR.
DAN M. FINCH
BY
ATTORNEY Dec. 17, 1963   D. M. FINCH   3,114,506
LIGHT FIXTURE FOR LINEAL GUIDANCE SYSTEM
Original Filed Feb. 19, 1959   3 Sheets-Sheet 3

INVENTOR.
DAN M. FINCH
BY  *A. Dunham Olver*
ATTORNEY

United States Patent Office 3,114,506
Patented Dec. 17, 1963

3,114,506
LIGHT FIXTURE FOR LINEAL GUIDANCE SYSTEM
Dan M. Finch, Berkeley, Calif., assignor to The Regents of the University of California, Berkeley, Calif.
Original application Feb. 19, 1959, Ser. No. 794,358. Divided and this application Dec. 29, 1959, Ser. No. 46,853
2 Claims. (Cl. 240—1.2)

This invention relates to improvements in guidance systems for vehicles traveling on or near the ground. More particularly, it relates to an improved light fixture that is especially well adapted for use in lineal contour guidance systems. This application is a division of Serial No. 794,358, filed February 19, 1959.

The control and accommodation of air traffic around and on airports is a vastly complex problem which has grown more serious due to the rapid rise in aircraft transport traffic in recent years and to the increase in speed of modern jet aircraft. A major aspect of this serious problem is the guidance of aircraft at the terminus of their approach to the runway, just before contacting the runway and during the landing roll following touchdown. Since, in a given airport facility, all the aircraft intending to land under instrument conditions must, generally, use the same runway, it is essential that every aircraft, after landing, clear the runway as quickly as possible to make room for the next aircraft preparing to land.

Congestion has been relieved during daytime hours by using high-speed taxiways or turnouts by which the landing aircraft turns away gradually from the runway while still rolling at a relatively high speed, instead of taxiways at right angles to the runways, which require aircraft to decelerate to very low speeds before they are able to turn off. During daylight, the runways and high-speed taxiways may be adequately marked with paint, so that an aircraft can continue its landing roll following touchdown, at a higher speed and with the turnout well marked can enter the turnout and clear the runway at a rapid rate, leaving it clear for the next aircraft to land.

However, at night there has been no way to keep the turnoff passageway well marked and visible at such a distance that the pilot will be guided with a minimum of confusion along the prescribed pathway, allowing sufficient reaction time to smoothly and safely maneuver the aircraft. In my parent application Serial No. 794,358 I disclosed means of solving this and other ground-guidance problems by providing a novel system of light paths on the runway surface formed by a large plurality of small paint light sources that delineate the route which the pilot is to follow and guide him clearly and rapidly along his route so that he can clear the runway as quickly as in the daytime.

It is apparent that in order to provide light sources which can be located to delineate a runway centerline over which aircraft are traveling, the problem must be solved of producing efficient light intensity while maintaining adequate protection for the light source. Further problems of installation and maintenance required solution before the centerline lighting system could become technically and economically feasible. The present invention therefore includes novel forms of light fixtures which overcome all of the disadvantages that would normally be expected in installing lights directly on the runway surface. The lighting fixtures permit the installation of small light sources directly on the runway surface or just below the surface, where flush mounting is desired, where they may emit their light rays in the desired direction and yet are protected from aircraft wheels which roll over them. Other problems include providing accessibility for maintenance and bulb replacement without reducing the protection for the light source and the provision of an easily mounted fixture capable of low-cost large-quantity production.

Therefore, an object of my invention is to provide a runway light fixture which is attached directly to the runway surface and houses a light source such as a light bulb, and which affords protection for the light source so that the light bulb will not be damaged by the wheels rolling over the fixture.

Another object of the present invention is to provide a protective light fixture for a runway, which is mounted flush with the runway surface and provides protection for the light source while permitting it to emit rays in the desired direction.

More specifically, a further object of my invention is to provide a durable, inexpensive, substantially flush lighting fixture for a runway or roadway guidance system having electrical contact means in the fixture to receive replaceable light sources, the contact means being connectable to an exterior supply line; the lighting fixture also having a shape to partially enclose the light source so that it emits rays from the fixture that can be viewed from an approaching vehicle and yet is protected from damage by wheels which roll over the fixture.

Other objects and advantages of the invention will be understood from the following description of a preferred embodiment thereof.

In the drawings:

FIG. 1 is a plan view of a runway-lighting fixture having a plano-convex protective housing and a separate mounting plate.

FIG. 2 is a view in side elevation and in section of the fixture, taken along the line 2—2 in FIG. 1. One end has been broken off to save space.

FIG. 3 is a fragmentary view in side elevation of a lighting fixture showing means of attaching said fixture to the runway surface using spikes driven through holes in the fixture.

FIG. 4 is a fragmentary view in side elevation and in section of the fixture of FIG. 2, showing the electrical pin-connectors pointing downward to contact the supply line installed in runway grooves.

FIG. 5 is a plan view of a modified form of runway-lighting fixture using a rectangular mounting plate, for the bulb contact clips.

FIG. 6 is a view in front elevation and in section taken along line 6—6 of the fixture shown in FIG. 5.

FIG. 7 is a fragmentary view in side elevation taken along line 7—7 of FIG. 5.

FIG. 8 is a reduced fragmentary plan view showing the installation of the fixture shown in FIG. 5, wherein lead lines extending from the side of the fixture are attached to a supply line lying on the runway surface.

FIG. 9 is a reduced fragmentary plan view showing the installation of the fixtures with the supply line running directly beneath the fixtures.

FIG. 10 is a fragmentary plan view of the fixture of FIG. 5, wherein the light source is connected to the supply line beneath the mounting-plate.

FIG. 11 is a fragmentary view in front elevation and in section taken along line 11—11 of FIG. 10.

Figure 12:
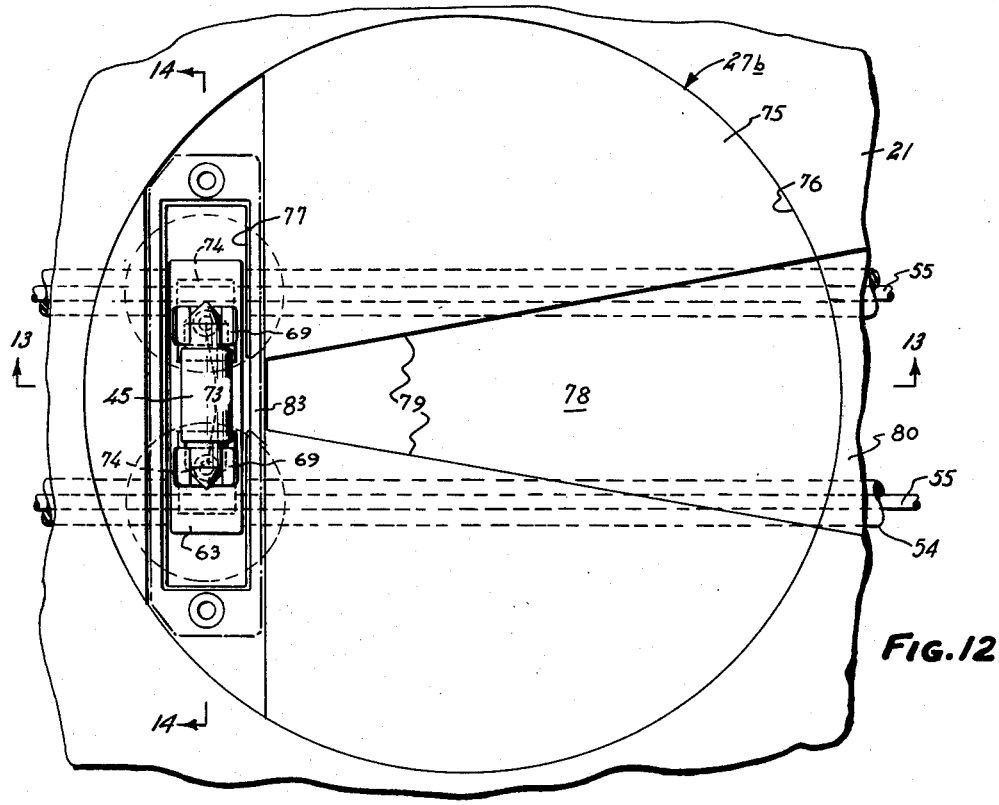
FIG. 12 is a plan view of modified form of flush-mounted runway-lighting fixtures installed in the runway surface, wherein the light source is connected to the supply line beneath the mounting-plate. Note that the light cover is shown in phantom.
Figure 13:
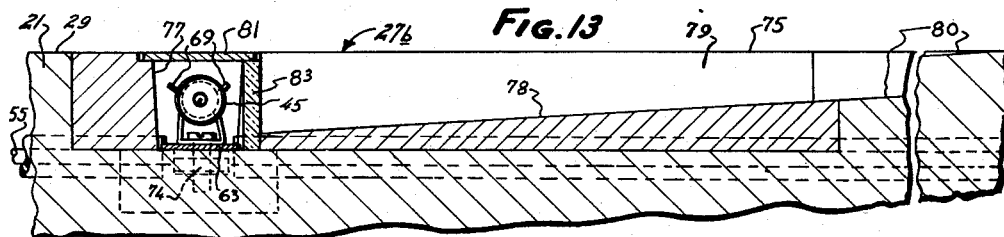
FIG. 13 is a fragmentary view in side elevation and in section taken along line 13—13 of the fixture shown in FIG. 12.
Figure 14:
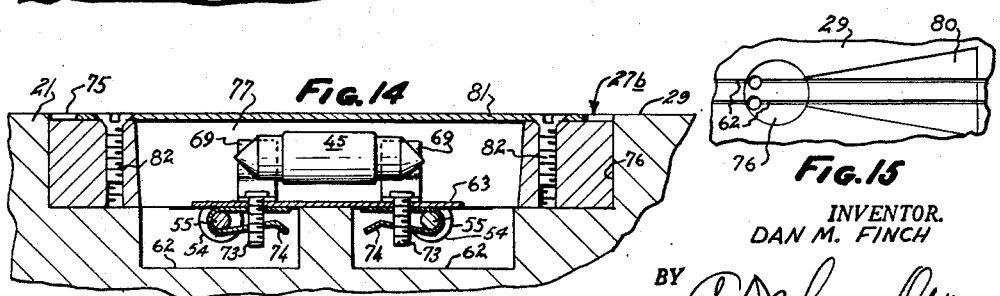
FIG. 14 is a fragmentary view in front elevation and in section taken along the line 14—14 of FIG. 12.

To make possible the runway lighting system which I have described in my application Serial No. 794,358, a plurality of small light sources is required to be installed on the runway surface. Aircraft wheels must be able to roll easily over the lights and yet the light beams must still be directed in the appropriate direction to be viewed by an approaching aircraft. In the present invention, I have solved this problem by providing a novel light fixture 27 which houses and protects the light source while permitting it to emit light rays which can be seen from the desired direction necessary to produce lineal contours.

The lighting fixture 27 shown in various forms in FIGS. 1 to 15 may be mounted on the runway 21, and in the form shown in FIGS. 1 to 4 I use a mounting plate 42 which is preferably circular and may be made from any durable material such as aluminum. Mounted on mounting plate 42 are bulb-contact clips 43, 44 to hold the bulb 45. One clip 43 is attached and grounded to the mounting plate 42 by a connecting element 46, and screws, 47, and the other contact clip 44 has a connecting element 48 which is insulated from the mounting plate 42 by means of fibre separators 49, 50, or some equivalent insulation means, and attached by screws 51 to the mounting plate 42. A first contact pin 52 is fastened to the insulated connecting element 48 and a second contact pin 53 is attached to the mounting plate 42, the pins 52 and 53 extending upward. Contact pins 52 and 53 are pointed and are so located that they are readily connected to a two-conductor ripcord supply line 54 by forcing the pins 52 and 53 through the wire insulation to make contact with each conductor 55.

A protective disc 56, which may be made from aluminum or some equivalent material, is placed on top of the mounting baseplate 42 to protect the light bulb 45 from tire damage, as well as to shield the light so that it is observed only from the desired viewing direction. The fixture 27 may be of any desired size, but it is found that an over-all diameter of approximately 6 inches is sufficient to support and protect the bulb 45. The protective disc 56 has a generally semi-spherical or plano-convex shape and may be only ⅝-inch high in order adequately to protect the bulb 45. The bulb 45 is mounted to lie within a cavity 57 generally located in the center of disc 56, with the bulb completely below the outer surface of the disc 56. The sloping sides of the disc 56 form, in effect, a ramp which allows the aircraft tires to roll easily up over the bulb 45, if an aircraft should pass directly over the fixture 27. The cavity 57 in said disc will accommodate 3, 5, or 15-watt festoon-style tubular tungsten-filament light bulbs which have standard contacts 58 at either end to engage contact clips 43 and 44. These bulbs 45 are especially adaptable to this use because of their lineal filament shape, small cross-section, ease of mounting, and ready availability at low cost. It is apparent that other types of bulbs and contacts, well known in the art, could be employed without departing from the spirit of the invention. For example, quartz envelopes for small bulbs now under development may eventually permit power as high at 200 watts to be used in bulbs having the same size as the present 15-watt bulbs.

In FIG. 1, which shows a plan view of one embodiment of the runway light fixture 27, a slot 59 for the supply line 54 is shown extending along one side of the protective disc 56. Extending from the bulb cavity 57 is an outwardly flaring throat 60 which directs the light rays in the desired direction. The angle 61 of the throat flare may be varied as desired, to provide variations in beam coverage from any specified direction. For example, it is possible to extend the throat 60 in the opposite 180° direction, if the light fixture 27 is to be used to provide guidance for landing in both directions. The bulb cavity 57 in the protective disc 56 also provides access to the bulb 45 for maintenance, and the bulbs 45 may be snapped in or out by hand or by hand tools. Also, the light fixtures 27 are not affected by drainage problems, since the bulbs 45 are slightly above the surface and may be operated with no ill effects even when completely submerged in sheets of rainwater.

Where it is found to be desirable to place the supply line 54 in a groove 62 in the runway surface 29, the fixture 27 may be modified by reversing the direction of the contact pins 52 and 53 to point downward to contact the supply line 54, as shown in FIG. 4. This procedure will permit the lighting circuitry to be placed entirely below the runway surface 29 to prevent excessive wear from traffic rolling over the fixtures 27.

A modified form of light fixture 27ª is shown in FIGS. 5 and 6. Here, a mounting plate 63 is reduced to a generally rectangular shape adapted to fit the bulb cavity 64 which extends through the center portion of the plano-convex protective housing 65. The disc-like housing 65 is made in the same manner and has the same external plano-convex shape as the earlier modification shown in FIG. 2, having a protective bulb cavity 64, a passage or slot 66 to allow entrance of lead wires 67, and a flaring throat 68 leading from the bulb cavity 64 to the edge of the housing 65 to permit proper viewing of the light bulb 45. The mounting plate 63 may be made from Micarta or some equivalent non-conductive material. On the mounting plate 63 are attached two contact fuse-clips 69 by means of rivets 70, which support the bulb 45. The rivets 70 also hold in place electrical connectors 71 which join the lead wires 67 to the clips 69. A U-shaped clip 72 may be used around the end of the bulb 45 to keep it positioned in the cavity 64. The rectangular mounting plate 63 with the bulb 45 clipped in place is merely placed in the cavity 64 with the lead wires 67 extending out through slot 66 to attach to the main supply-line, as shown in FIG. 8.

The arrangement of the electrical connecting means of the bulb 45 may be modified to facilitate an installation wherein the supply lines 54 are placed in grooves 62 in the runway surface 29 which runs directly under the light fixtures 27ª, as shown in FIG. 11. In this arrangement, shown in FIGS. 10–11, the contact clips 69 for bulb 45 are fixed to the rectangular mounting plate 63 by such means as sheet-metal screws 73 which extend through the contact clips 69 and the mounting plate 63 to retain clip members 74, such as standard Tinnerman nuts, on the underside of the mounting plate 63. The clip members 74 retain and directly contact the supply line 54, allowing current to pass through the bulbs 45. The supply line 54 is installed in grooves 62 cut in the runway surface 29 and passing under each fixture.

The plano-convex type of fixture shown in FIGS. 1–11 extends slightly above the runway surface and, though being the most convenient and least expensive to install, may not be entirely satisfactory in areas where snow removal from the runway 21 is a vital necessity. For example, military airfields requiring a constant state of readiness may find that the slight protrusions on the runway surface 29 will slow the snow-plowing process. To overcome this difficulty, another modification of the fixture 27 can be employed, using an entirely flush fixture 27ᵇ as shown in FIGS. 12–15.

Figure 15:
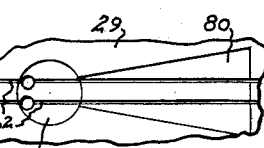
FIG. 15 is a reduced fragmentary plan view of the runway surface as prepared for installation of the fixture shown in FIGS. 12—14.

For a fully flush installation, the housing 75 of fixture 27ᵇ may be a round plate or any convenient shape of plate, again made from a durable material such as aluminum or plastic, and adapted to fit a hole 76 of similar size cut in the runway surface 29 as shown in FIG. 15. A bulb-cavity 77 of substantially rectangular shape is again cut in the flush-type housing 75 and the bulb 45 is installed in either of the two manners shown in relation to the previous embodiment shown in FIGS. 6 and 11, using the separate rectangular mounting plate 63. An open throat 78 is cut in the housing 75 with its sides 79 flaring outwardly from the bulb-cavity 77 at an angle of approximately 10°, similar to angle 61 shown in FIG. 1, depending on the angle of viewing desired. The throat 78 slopes downward from the outer side of the housing 75 to contact the bulb-cavity 77.

With the flush-light installation, I prefer to provide a sloping ramp 80 on the runway surface 29, which leads into the throat 78 of the housing 75 (see FIG. 15). The bulb-cavity 77 may be placed on the rearward portion of the housing 75 on its side farthest from the runway threshold, so that less material must be removed from the runway surface 29 to permit the light source to be viewed at a distance from a low angle of incidence. While it is possible to use the flush-mounted housing 75 with supply wires 54 running under the fixture or by its side, using the bulb-mounting installation modification shown in FIG. 9 and FIG. 8, I prefer to use the former, employing the mounting plate 63 as shown in FIG. 11, which contacts the bare portions 55 of supply lines 54 running directly under the housing 75.

The installation of the fully-flush fixtures (see FIG. 14) is performed in a relatively simple manner by drilling the fixture holes 76 in the concrete or asphalt runway surface 29 with rotary drills (having diamond cutters), to the depth required of approximately ¾". As shown in FIG. 15, the grooves 62 for retaining the supply wires 54, and the ramp 80, are similarly cut by using rotary saws.

Other modifications of my invention may be made to solve additional operational problems. For example, it has been found that in the immediate aircraft touch-down area, the impact of the aircraft tires directly on the fixture surface will cause the tire to deform sufficiently to protrude into the cavity 77 to occasionally damage the bulb 45. Thus, as shown on the modification in FIGS. 12 and 13, in the touchdown area, up to approximately 2,000 feet from the approach end of the runway, I may attach a cover 81 by means of screws 82 tapped in the housing 75 to prevent breakage of the bulb 45.

Also another modification of my fixture may be made by placing a glass or plastic window 83, held across the throat 68 of the housing 65 by some means such as slots 84, as shown on the modification of FIG. 5. This serves to prevent the accumulation of dust particles or other fouling material from entering the throat 68 and depositing on the bulb 45. The window 83 may also be made of colored glass to provide various colored marking patterns on the runway surface.

The light fixtures 27, whether mounted within holes to be flush or on top of the runway surface 29, may be attached to the runway surface 29 by any of several methods, depending on the type of runway surface. For example, studs (not shown) may be explosively driven into a concrete runway surface 29 and fastened by machine screws. In FIG. 3, the fixture 27 is shown attached by spikes 89 driven through holes 90 which are counterbored in the fixture housing 56. For most satisfactory results, I prefer to mount the fixtures 27 by applying an adhesive substance such as a rubber-base type to the bottom portion of the fixture and merely cementing it to the runway surface 29.

In operation, the fixtures 27—taking, for example, the modifications shown in FIG. 1—are placed on the runway surface 29 and attached in one of the aforementioned prescribed manners. The contact pins 52 and 53 are connected with a supply line of a low-voltage system. The bulb 45, attached firmly in place in contact clips 43 and 44 on the mounting plate 42, receives the current to produce one of a plurality of light sources for a runway lighting system. The current essentially flows through pin 52 connected by insulated connector 48 to the bulb 45 and thence via connector 46 to the mounting plate 42 which is connected to supply line 54 directly by second contact pin 53. As an aircraft rolls down the runway, the disc 56 around the bulb 45 protects it and causes the aircraft wheels to roll easily over the fixture 27, the disc 56 also being shaped to direct the light rays via throat 60.

The lighting fixtures of the present invention, thus easily installed in the center of the runway, will permit the exploitation of the highly advantageous contour-lighting principle, while providing only an occasional slight bump over which the aircraft must travel. This occasional contact of the aircraft nosewheel with the centerline lighting fixtures will cause only a slight vibration to the aircraft and will in no way endanger the aircraft control, and this small inconvenience is outweighed by the greater advantages of the lineal contour airline guidance system.

To those skilled in the art to which this invention relates, many changes in construction and widely differing embodiments and applications of the invention will suggest themselves without departing from the spirit and scope of the invention. Therefore, the disclosures and the description herein are purely illustrative and are not intended to be in any sense limiting.

I claim:
1. A marking light fixture for a vehicular roadway comprising a mounting plate attached to the runway surface, first and second spaced electrically conductive contact clips attached to said mounting plate, the first of said contact clips being attached directly to and thus grounded to said mounting plate, means to insulate said second contact clip from said mounting plate, said contact clips engaging the terminals of a light bulb to retain it therebetween, a solid, opaque plano-convex protective cover having a central cavity and attached to said mounting plate with its curved portion upwardly, the walls of the cavity partially surrounding said light bulb, and extending thereabove to protect it from wheels rolling over the fixture, the planar wall of the protective cover having a groove therein spaced from the cavity, a pair of electrical supply conductors located in the groove, and a rigid contact member extending, respectively, from one of the contact clips and said mounting plate upwardly into the groove and in contacting engagement with a respective conductor for energization of the light bulb, the upper surface of the protective cover being provided with a groove extending from the central cavity and which flares outwardly toward the periphery of the cover.

2. A marking light fixture as defined by claim 1, the electrical supply conductors being insulated and the contact members comprising pins extending through the insulation into contact with the respective conductors.

References Cited in the file of this patent

UNITED STATES PATENTS

| | | |
|---|---|---|
| 2,038,506 | Cadieux | Apr. 21, 1936 |
| 2,110,513 | Toelke | Mar. 8, 1938 |
| 2,185,488 | White | Jan. 2, 1940 |
| 2,212,537 | Coulter | Aug. 27, 1940 |
| 2,353,882 | Despard | July 18, 1944 |
| 2,638,576 | O'Brien | May 12, 1953 |
| 2,692,374 | Carson | Oct. 19, 1954 |
| 2,848,597 | Knottnerus | Aug. 19, 1958 |

FOREIGN PATENTS

| | | |
|---|---|---|
| 760,427 | Germany | July 5, 1954 |
| 1,161,524 | France | Mar. 24, 1958 |
| 559,166 | Belgium | July 31, 1957 |